(12) United States Patent
Chiang et al.

(10) Patent No.: US 8,243,047 B2
(45) Date of Patent: Aug. 14, 2012

(54) CALIBRATING APPARATUS AND METHOD

(75) Inventors: Ching-Chun Chiang, Tao Yuan Shien (TW); Yi-Ming Huang, Banchiao (TW); Yun-Cheng Liu, Banciao (TW); Chin-Kang Chang, Taoyuan (TW)

(73) Assignee: Quanta Computer Inc., Tao Yuan Shien (TW)

( * ) Notice: Subject to any disclaimer, the term of this patent is extended or adjusted under 35 U.S.C. 154(b) by 770 days.

(21) Appl. No.: 12/453,302

(22) Filed: May 6, 2009

(65) Prior Publication Data

US 2010/0079412 A1    Apr. 1, 2010

(30) Foreign Application Priority Data

Oct. 1, 2008   (TW) ................................ 97137733 A

(51) Int. Cl.
*G06F 3/042* (2006.01)
*G06F 3/041* (2006.01)

(52) U.S. Cl. ........................................ 345/175; 345/173

(58) Field of Classification Search .......... 345/156–184; 178/18.01–20.04
See application file for complete search history.

(56) References Cited

U.S. PATENT DOCUMENTS

| | | | | |
|---|---|---|---|---|
| 7,599,520 B2* | 10/2009 | Dempski et al. | ............... | 382/103 |
| 7,948,479 B2* | 5/2011 | Liu et al. | ....................... | 345/173 |
| 2006/0202974 A1* | 9/2006 | Thielman | ..................... | 345/175 |
| 2009/0135162 A1* | 5/2009 | Van De Wijdeven et al. | ............................. | 345/175 |
| 2009/0195500 A1* | 8/2009 | Huang et al. | ................... | 345/157 |
| 2010/0201639 A1* | 8/2010 | Huang et al. | ................... | 345/173 |
| 2011/0102375 A1* | 5/2011 | Liu et al. | ...................... | 345/175 |

* cited by examiner

*Primary Examiner* — Alexander Eisen
*Assistant Examiner* — Patrick F Marinelli
(74) *Attorney, Agent, or Firm* — Thomas, Kayden, Horstemeyer & Risley, LLP

(57) ABSTRACT

A calibrating apparatus for an image processing apparatus is disclosed. The calibrating apparatus comprises a first operating module and a second operating module. The first operating module determines a third indicating point and a fourth indicating point according to a first indicating point, a second indicating point, and a specific point, and determines a calibration point (i.e. the predetermined position of a sensor) according to a first line through the first indicating point and third indicating point and a second line through the second indicating point and fourth indicating point. The second operating module forms reference lines according to reference points and the calibration point, forms reference angles according to the reference lines and a parallel line, generates reference coordinates of the reference points in an image and generates a calibration function according to the reference coordinates of the reference points and the reference angles.

20 Claims, 8 Drawing Sheets

CALIBRATING APPARATUS AND METHOD

BACKGROUND OF THE INVENTION

1. Field of the Invention

The invention relates to image processing, and more particularly to a calibrating apparatus and method for calibrating a light sensor of an image processing apparatus.

2. Description of the Related Art

In recent years, with the advances in image processing technology, a variety of input methods (e.g., utilizing a touch panel, voice inputting, gesture inputting, etc.) which are convenient to users are gradually getting much more attention by the market and are flourishing.

Generally, a common optical touch screen usually includes at least two light sensors for detecting the states of the touch points on the screen. For example, when the user emits light (such as through a light pen) on an optical touch screen to form a light point, the optical touch screen can capture the image corresponding to the screen with the light sensor and determine the coordinate of the light point on the screen with image processing technology to achieve the goal of inputting.

Additionally, the optical touch screen can also capture the image corresponding to the user's gesture with the light sensor and achieve the effect of gesture inputting by utilizing image processing technology and gesture recognition technology. The light sensor can also capture images with a wide-angle lens or a fish-eye lens, so that the whole screen can be detected by the light sensor within a very short distance.

However, if the position or the angle of the light sensor in the optical touch screen is not installed well, the precision of the state of the detected touch point will be seriously affected. The deviations can even lead to erroneous judgment of the touch point inputted by the user which can be must worse.

Therefore, the major scope of the invention is to provide a calibrating apparatus and method which can be applied in an image processing apparatus to solve the aforesaid problems.

SUMMARY OF THE INVENTION

A scope of the invention is to provide a calibrating apparatus and method which can be applied in an image processing apparatus. The position and the angle of a light sensor in the image processing apparatus can be correctly adjusted with the assistances of the calibrating apparatus and method, so that the precision of the state of the touch point detected by the image processing apparatus or that of gesture recognition can be increased.

An embodiment according to the invention is a calibrating apparatus. The calibrating apparatus can be used to calibrate the position and the angle of a light sensor in the image processing apparatus (e.g., an optical touch screen). The image processing apparatus includes at least one light sensor and a panel. A first indicating point, a second indicating point, and a plurality of reference points, whose coordinates are already known, are displayed on the panel, and the at least one light sensor is located at a predetermined position near a specific point on the circumference of the panel.

In the embodiment, the calibrating apparatus includes a first processing module and a second processing module. Firstly, the first processing module determines a third indicating point and a fourth indicating point according to the first indicating point, the second indicating point, and the specific point and determines a calibration point (i.e. the predetermined position of the at least one light sensor) according to the first line which passes through the first indicating point and the third indicating point and a second line which passes through the second indicating point and the fourth indicating point. Afterwards, the second processing module forms a plurality of reference lines according to the reference points and the predetermined position and forms a plurality of reference angles according to the reference lines and a base line, generates a plurality of reference point coordinates which respectively corresponds to the reference points in an image of the light sensor, and generates a calibration function according to the reference point coordinates and the reference angles.

Because the calibration point (predetermined position) and the calibration function have been generated by the first processing module and the second processing module respectively, the position of the at least one light sensor can be adjusted according to the calibration point or the angle between the light sensor and a base line can be adjusted according to the calibration function, so as to achieve the effect of calibrating the light sensor.

Finally, the calibrating apparatus can determine the touch point on the panel by triangle positioning.

Another the embodiment according to the invention is a calibrating method. The calibrating method can be used in an image processing apparatus which includes a panel and at least one light sensor. In the embodiment, a first indicating point, a second indicating point, and a plurality of reference points, whose coordinates are already known, are displayed on the panel, and the at least one light sensor is located at a predetermined position near a specific point on the circumference of the panel.

The calibrating method can be substantially divided into two stages. In the first stage, the calibrating method will be performed to determine the calibration point (predetermined position) for adjusting the position of the at least one light sensor. Firstly, the calibrating method is performed to determine a third indicating point and a fourth indicating point on the panel according to a first indicating point, a second indicating point, and the specific point on the circumference of the panel. Afterwards, the calibrating method is performed to determine the calibration point (predetermined position) according to a first line which passes through the first indicating point and third indicating point and a second line which passes through the second indicating point and fourth indicating point.

In the second stage, the calibrating method is further performed to generate the calibration function between coordinates and angles for adjusting the angle of the at least one light sensor. Firstly, the calibrating method is performed to generate a base line which passes through the calibration point (predetermined position) and is parallel to the circumference of the panel. Afterwards, the calibrating method is performed to form a plurality of reference lines according to the reference points and the predetermined position and form a plurality of reference angles according to the reference lines and the base line. Then, the calibrating method is performed to generate a plurality of reference point coordinates which respectively corresponds to the reference points in an image of the at least one light sensor and generate a calibration function according to the reference point coordinates and the reference angles.

Compared with prior arts, the calibrating apparatus and method according to the invention can effectively calibrate the position and the angle of a light sensor in an image processing apparatus according to a plurality of indicating points, whose coordinates are already known, are displayed on the panel, to avoid erroneous touch point judgments because of the deviations of the position and the angle of the light sensor. Thereby, the calibrating apparatus and method according to the invention can greatly increase the precision of the state of the touch point detected by the image processing apparatus or that of gesture recognition.

The advantage and spirit of the invention may be understood by the following recitations together with the appended drawings.

BRIEF DESCRIPTION OF THE APPENDED DRAWINGS

DETAILED DESCRIPTION OF THE INVENTION

The invention provides a calibrating apparatus and method for an image processing apparatus. The position and the angle of a light sensor in the image processing apparatus can be correctly adjusted with the assistances of the calibrating apparatus and method, so that the precision of the state of the touch point detected by the image processing apparatus or that of gesture recognition can be increased. The spirit and feature of the invention will be described in details with the following embodiments.

Figure 1:
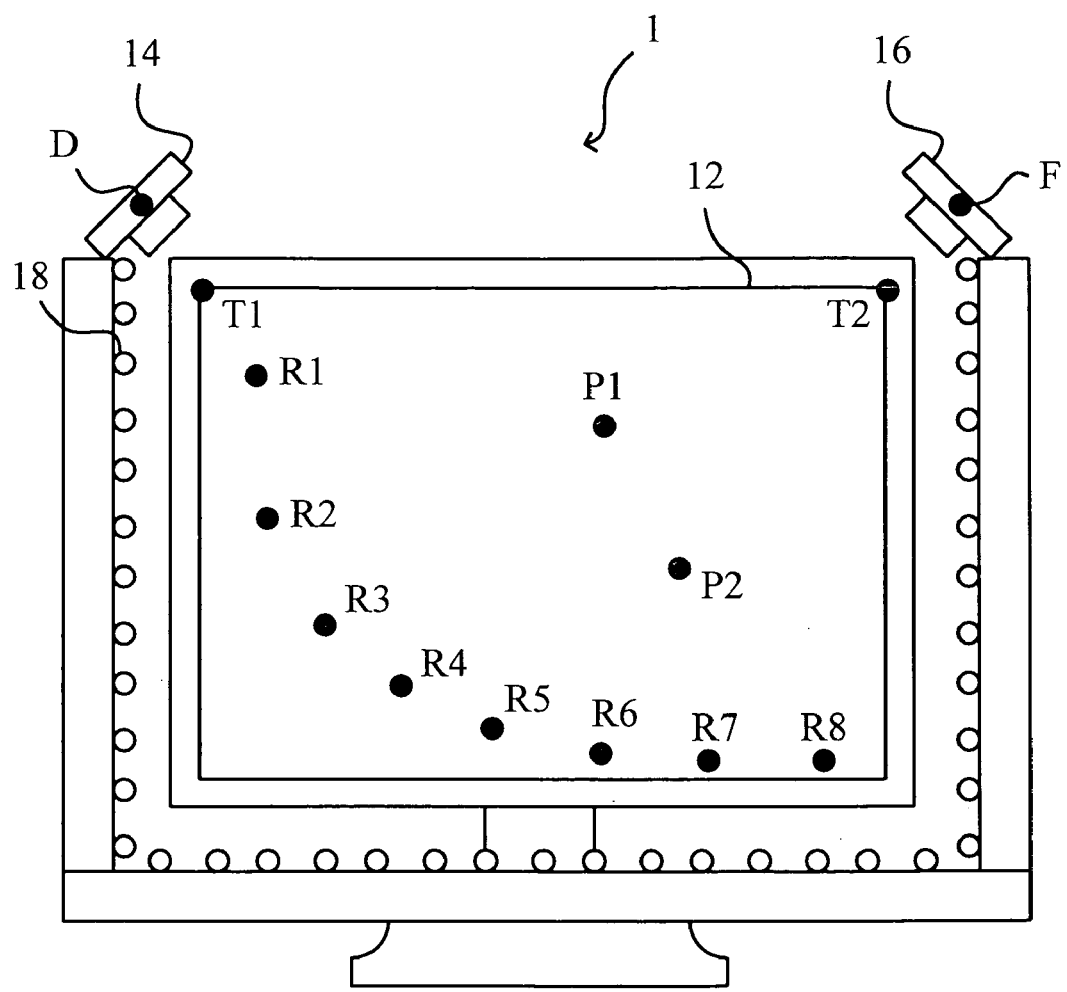
FIG. 1 is a schematic diagram illustrating an optical touch screen.

The first embodiment according to the invention is a calibrating apparatus. The calibrating apparatus is capable of calibrating the position and the angle of a light sensor in an image processing apparatus (such as an optical touch screen). Please refer to FIG. 1. FIG. 1 is a schematic diagram illustrating an optical touch screen. As shown in FIG. 1, the optical touch screen 1 includes a panel 12, a first light sensor 14, a second light sensor 16, and a plurality of light unit 18 (such as LEDs). The first indicating point P1, the second indicating point P2, and the eight reference points R1~R8, whose coordinates are already known, are displayed on the panel 12. In one practical application, the first indicating point P1, the second indicating point P2, and the reference points R1~R8 are used to be touched with users' fingers or other objects (such as a stylus) on the panel 12 for calibrating.

In the embodiment, the first light sensor 14 is disposed at the first predetermined position D near the apex T1 (the first specific point) at the upper left corner of the circumference of the panel 12; the second light sensor 16 is disposed at the second predetermined position F near the apex T2 (the first specific point) at the upper right corner of the circumference of the panel 12. The first light sensor 14 and the second light sensor 16 are used to detect the variation of the light (e.g., being sheltered by a finger or a stylus) emitted form the light units 18 to generate the image.

Figure 2:
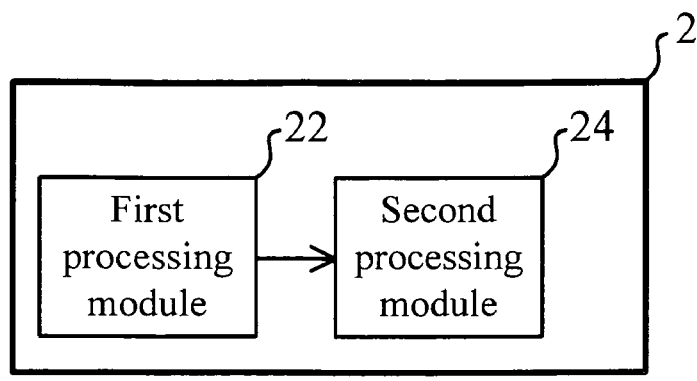
FIG. 2(A) is a block diagram illustrating a calibrating apparatus according the first embodiment of the invention.
FIG. 2(B) is a detailed block diagram illustrating the first processing module in FIG. 2(A).
Figure 2:
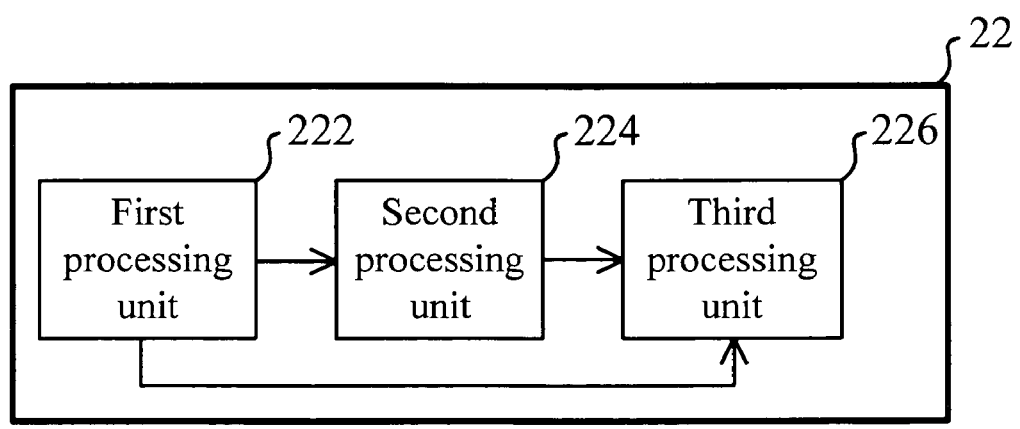

Please refer to FIG. 2(A). FIG. 2(A) is a block diagram illustrating a calibrating apparatus 2 according the first embodiment of the invention. As shown in FIG. 2(A), the calibrating apparatus 2 includes a first processing module 22 and a second processing module 24 coupled to the first processing module 22.

In the embodiment, the calibrating apparatus 2 calibrates the position or the angle of the first light sensor 14 (or the second light sensor 16) according to a known coordinate system, several points whose coordinates are known, and the image detected by the first light sensor 14 (or the second light sensor 16). The absolute position (i.e. the first predetermined position D or the second predetermined position F) or the angle features of the first light sensor 14 (or the second light sensor 16) after being calibrated are represented with the foregoing coordinate system and can be used to locate and detect the states of the touch points on the optical touch screen.

And, the modules and functions included in the calibrating apparatus 2 will be introduced below. In the embodiment, the origin of the adopted coordinate system is T1(0,0); the target calibrating apparatus 2 wants to adjust is the position and the angle of the second light sensor 16. In practical application, the calibrating apparatus 2 can calibrate the position and angle of any light sensor included in the optical touch screen 1, but is not limited to this only.

Please refer to FIG. 2(B). FIG. 2(B) is a detailed block diagram illustrating the first processing module 22 in FIG. 2(A). As shown in FIG. 2(B), the first processing module 22 includes a first processing unit 222, a second processing unit 224, and a third processing unit 226. Wherein, the first processing unit 222 is coupled to the second processing unit 224; the third processing unit 226 is coupled to the first processing unit 222 and the second processing unit 224.

Generally, because the capabilities of the processing units nowadays are very powerful, the first processing unit 222, the second processing unit 224, and the third processing unit 226 can be replaced by a single processing unit. Similarly, the first processing module 22 and the second processing module 24 can also be replaced by a single module or a single processing unit to implement the calibrating apparatus 22. The embodiment is just used to express the invention, but the invention is not limited to it.

Figure 3:
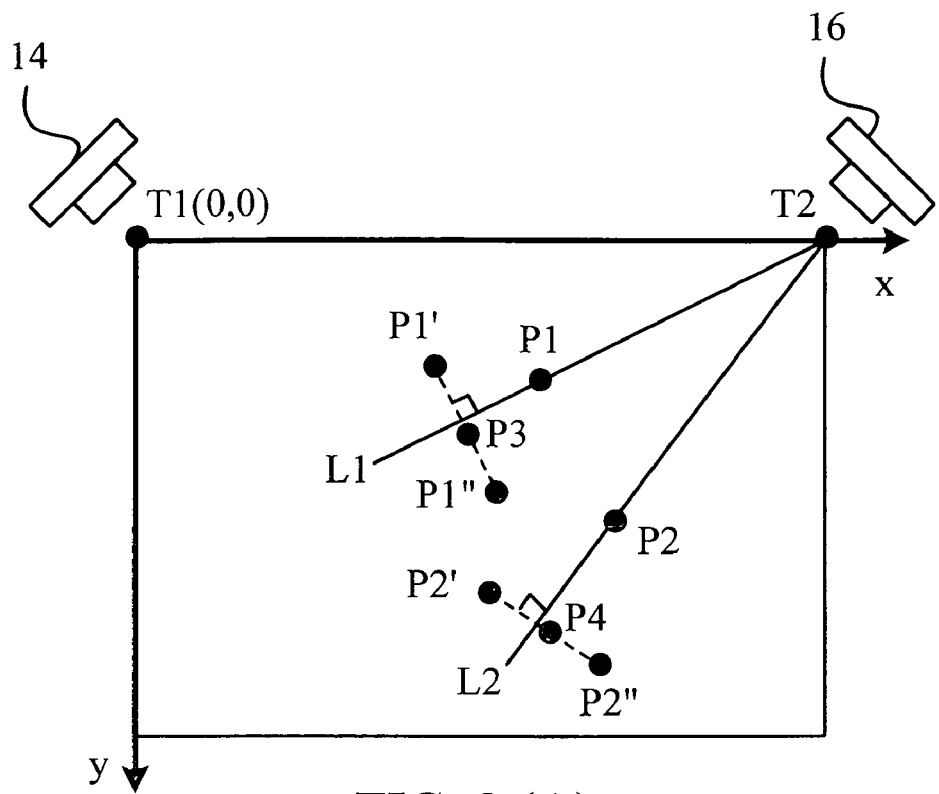
FIG. 3(A) is a schematic diagram illustrating a sample that the first processing module determines the third indicating point and the fourth indicating point.
FIG. 3(B) is a schematic diagram illustrating the first image which is detected by the second light sensor.
FIG. 3(C) is a schematic diagram illustrating the second image which is detected by the second light sensor.
Figure 3:
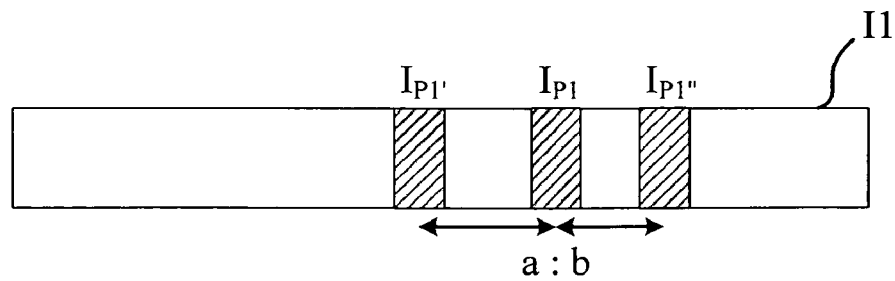
Figure 3:
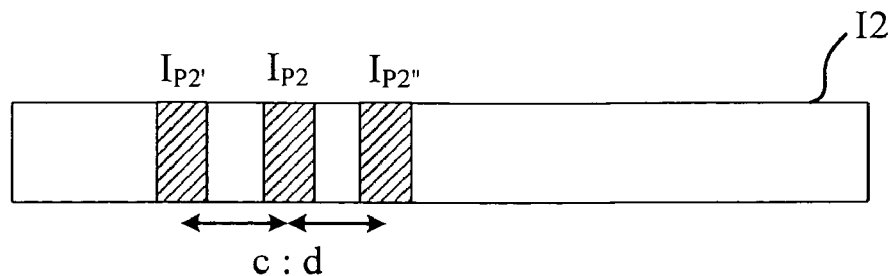

Firstly, the first processing unit 222 of the first processing module 22 will generate a first auxiliary line L1 and a second auxiliary line L2 according to the first indicating point P1, the second indicating point P2, and the second specific point T2. As shown in FIG. 3(A), the first processing unit 222 connects the second specific point T2 to the first indicating point P1 to form the first auxiliary line L1 and connects the second specific point T2 to the second indicating point P2 to form the first auxiliary line L2.

Afterwards, the second processing unit 224 will determine a first auxiliary point P1' and a second auxiliary point P1" which are respectively located on two sides of the first auxiliary line L1; and a third auxiliary point and a fourth auxiliary point which are respectively located on two sides of the second auxiliary line L2. How the second processing unit 224 generates the auxiliary points will be introduced below.

Please refer FIG. 3(B). FIG. 3(B) is a schematic diagram illustrating a first image I1 which is detected by the second light sensor 16. In the embodiment, the second processing unit 224 randomly generates a point P1' and a point P1" which are adjacent to each other on the screen. If the line which connects from the point P1' to the point P1" is perpendicular to the first auxiliary line L1, and the observation points $I_{P1'}$ and $I_{P1''}$ in the first image I1 which corresponds to the point P1' and the point P1" is located at two sides of the observation point $I_{P1}$ in the second image I1 which corresponds to the first indicating point P1, the point P1' and the point P1" match the requirement of the first auxiliary point and the second auxiliary point.

Similarly, please refer to FIG. 3(C). FIG. 3(C) is a schematic diagram illustrating the second image I2 which is detected by the second light sensor 16. If the line which is generated by the second processing unit 224 on the screen connects from the point P2' to the point P2" is perpendicular to the second auxiliary line L2, and the observation points $I_{P2'}$ and $I_{P2''}$ in the second image I2 which corresponds to the point P2' and the point P2" are located at two sides of the observation point $I_{P2}$ in the second image I2 which corresponds to the second indicating point P2, the point P2' and the point P2" match the requirement of the third auxiliary point and the fourth auxiliary point.

Afterwards, the second processing unit 224 will determine the third indicating point P3 according to the first auxiliary line L1, the first auxiliary point P1', and the second auxiliary point P1"; and determine the fourth indicating point P4 according to the second auxiliary line L2, the third auxiliary point P2' and the fourth auxiliary point P2", as shown in FIG. 3(A).

In the embodiment, the second processing unit 224 determines the third indicating point P3 and fourth indicating point P4 by utilizing interpolation. As shown in FIG. 3(B), in the first image I1, because the observation point $I_{P1'}$ corresponding to the first auxiliary point P1' and the observation point $I_{P1''}$ corresponding to the second auxiliary point P1" are respectively located at two sides of the observation point $I_{P1}$ corresponding to the first auxiliary point P1, the second processing unit 224 can calculate a first distance ratio a:b between the distance from the observation point $I_{P1'}$ to the observation point $I_{P1}$ and that from the observation point $I_{P1''}$ to the observation point $I_{P1}$ and derive the position of the third indicating point P3 according to the following interpolation equation.

$$P3 = \frac{b}{a+b}P1' + \frac{a}{a+b}P1''$$

Similarly, as shown in FIG. 3(C), in the second image I2, because the observation point $I_{P2'}$ corresponding to the third auxiliary point P2' and the observation point $I_{P2''}$ corresponding to the fourth auxiliary point P2" are respectively located at two sides of the observation point $I_{P2}$ corresponding to the second auxiliary point P2, the second processing unit 224 can calculate a second distance ratio c:d between the distance from the observation point $I_{P2'}$ to the observation point $I_{P2}$ and that from the observation point $I_{P2''}$ to the observation point $I_{P2}$ and derive the position of the fourth indicating point P4 according to the following interpolation equation.

$$P4 = \frac{d}{c+d}P2' + \frac{c}{c+d}P2''$$

Figure 4:
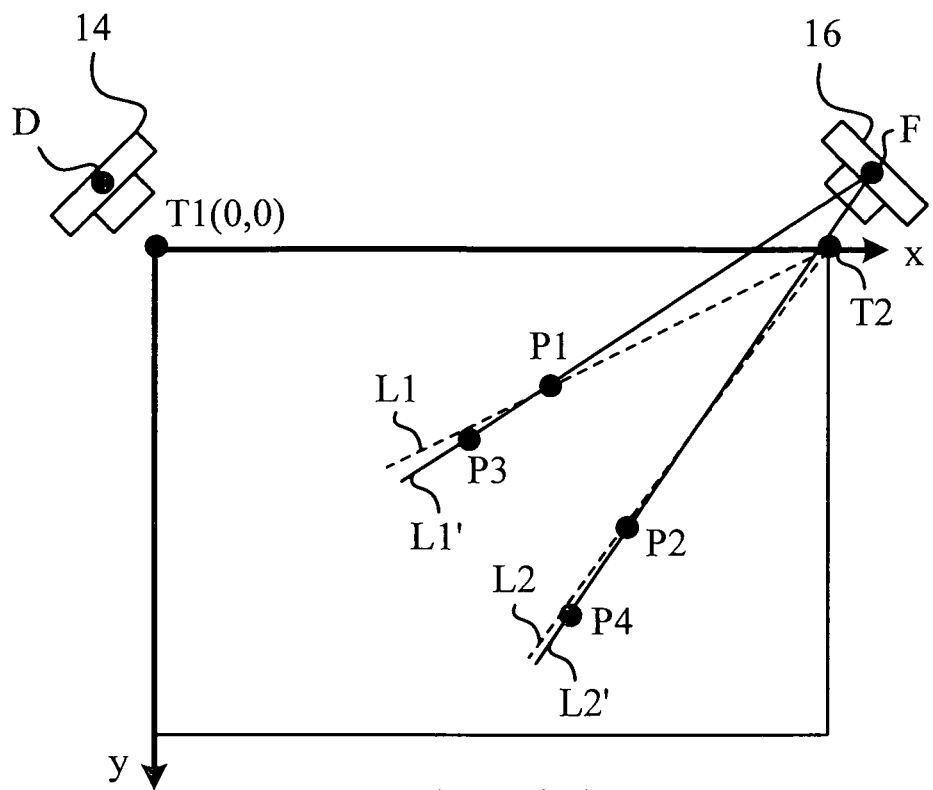
FIG. 4(A) is a schematic diagram illustrating a sample that the first processing module determines the second predetermined position.
FIG. 4(B) is a schematic diagram illustrating the third image which is detected by the second light sensor.
FIG. 4(C) is a schematic diagram illustrating the fourth image which is detected by the second light sensor.
Figure 4:
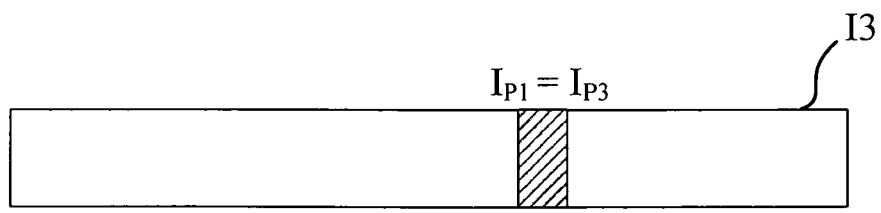
Figure 4:

As shown in FIG. 4(A), after the second processing unit 224 has determine the third indicating point P3 and the fourth indicating point P4, the third processing unit 226 will connect the first indicating point P1 to the third indicating point P3 to form a first line L1' and connect the second indicating point P2 to the fourth indicating point P4 to form a second line L2'. Please refer to FIG. 4(B) and FIG. 4(C). FIG. 4(B) is a schematic diagram illustrating the third image I3 is detected by the second light sensor 16. FIG. 4(C) is a schematic diagram illustrating the fourth image I4 which is detected by the second light sensor 16.

As shown in FIG. 4(B) and FIG. 4(C), the observation point $I_{P1}$ corresponding to the first indicating point P1 overlaps the observation point $I_{P3}$ corresponding to the third indicating point P3 in the third image I3, and the observation point $I_{P2}$ corresponding to the second indicating point P2 overlaps the observation point $I_{P4}$ corresponding to the fourth indicating point P4 in the fourth image I4. The intersecting point between the first line L1' which passes through the first indicating point P1 and the third indicating point P3 and the second line L2' which passes through the second indicating point P2 and the fourth indicating point P4 is the second predetermined position F of the second light sensor 16.

Similarly, the first processing module 22 can also calculate the first predetermined position D of the first light sensor 14 according to the foregoing approach.

After the first processing module 22 derives the second predetermined position F, the second processing module 24 will derive the calibration function related to the angle of the second light sensor 16 according to the reference points R1~R8 and the second predetermined position F, whose coordinates are already known, displayed on the panel 12. How the second processing module 24 generates the calibration function will be introduced in detail below.

Figure 5:
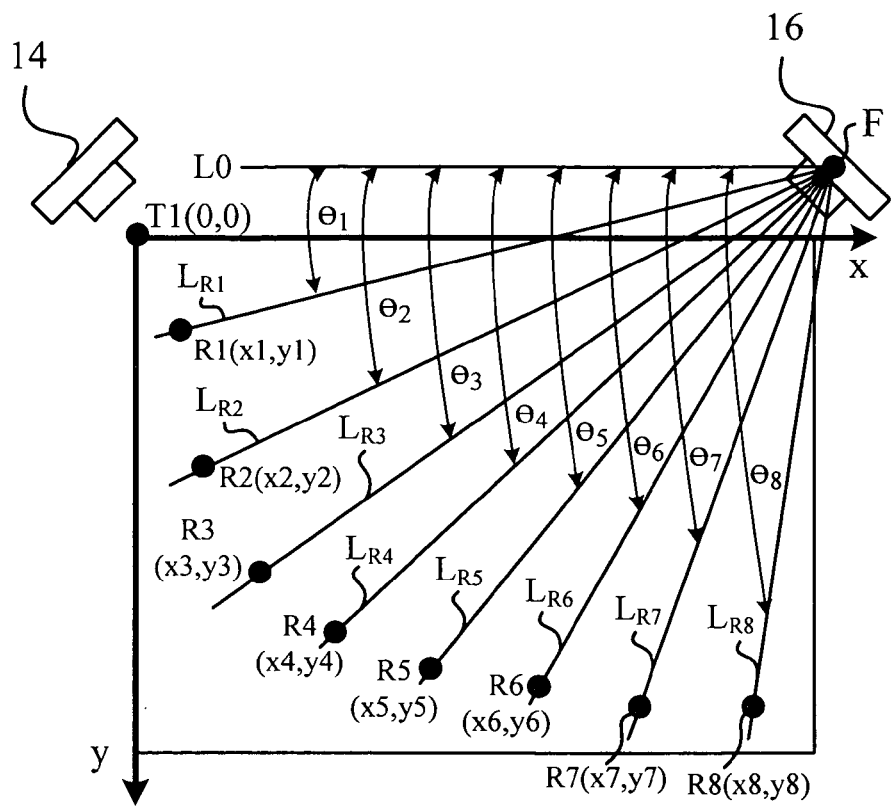
FIG. 5(A) is a schematic diagram illustrating a sample that the second processing module generates the calibration function.
FIG. 5(B) is a schematic diagram illustrating the fifth image which is detected by the second light sensor.
Figure 5:
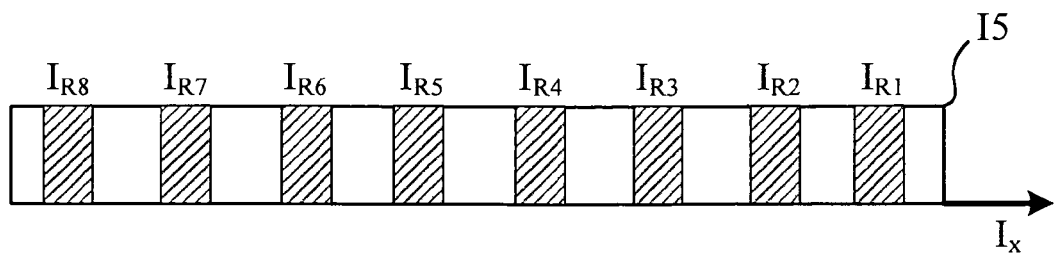

As shown in FIG. 5(A), the second processing module 24 will generate a base line L0 which passes through the second predetermined position F and is parallel to the x axis (the circumference of the panel 12) according to the second predetermined position F derived from the first processing module 22. Additionally, the second processing module 24 will connect the second predetermined position F to the reference points R1~R8 respectively to form eight reference lines $L_{R1}$~$L_{R8}$. Wherein, the coordinates of those reference points are R1(x1, y1), R2(x2, y2), R3(x3, y3) . . . , and R8(x8, y8). Because each of the reference lines and the base line L0 can form one included angle θ, second processing module 24 can define the angles as reference angles $θ_1$~$θ_8$.

Please refer to the FIG. 5(B). FIG. 5(B) is a schematic diagram illustrating the fifth image which is detected by the second light sensor. As shown in FIG. 5(B), in the fifth image I5, the reference points $I_{R1}$~$I_{R8}$ corresponds to the reference point R1~R8 respectively, and the reference points $I_{R1}$~$I_{R8}$ do not overlap each other (each of the reference points has a different reference coordinate within the coordinate system of the fifth image I5).

Figure 6:
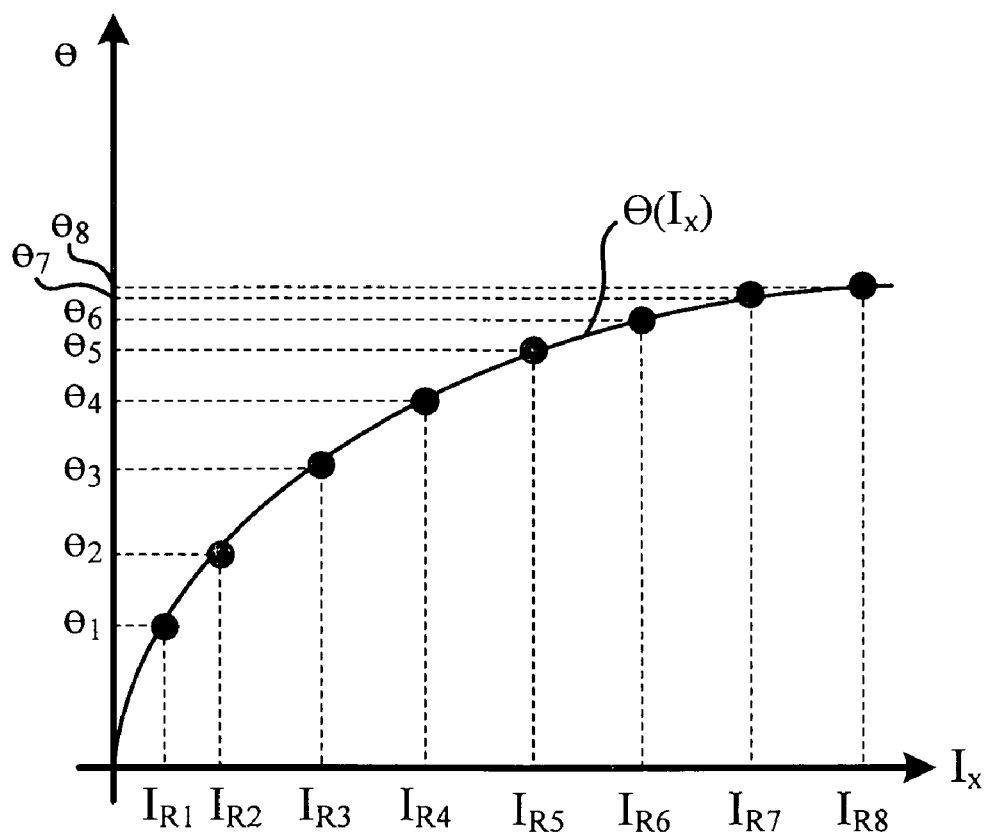
FIG. 6 is a schematic diagram illustrating the angle calibration function θ(Ix) corresponding to the x-coordinates of the reference points.

Since the coordinates of the reference points R1~R8 and the second predetermined position F are already known, the corresponding reference angles $θ_1$~$θ_8$ can be calculated. Therefore, the second processing module 24 can generate a calibration function according to the reference points $I_{R1}$~$I_{R8}$ and the reference angles $θ_1$~$θ_8$ in the fifth image I5 which corresponds to the reference points R1~R8 Please refer to FIG. 6. FIG. 6 is a schematic diagram illustrating the angle calibration function θ(Ix) corresponding to the Ix coordinate values of the reference points $I_{R1}$~$I_{R8}$. As shown in FIG. 6, the black points can show the relationship between the Ix coordinate values of the reference points $I_{R1}$~$I_{R8}$ and the corresponding reference angles $θ_1$~$θ_8$.

In the embodiment, to derive the angle calibration function θ(Ix), the second processing module 24 fits the curve in FIG. 6 with, but not limited to, the methods of numerical analysis and curve-fitting. In an embodiment, the quadratic curve-fitting method is adopted. The angle calibration function θ(Ix) is in form of $θ(Ix)=a_0+a_1(Ix)+a_2(Ix)^2$ wherein $a_0$, $a_1$, and $a_2$ are curve parameters. After being calculated by the second processing module 24, the values of the curve parameter $a_0$, $a_1$, and $a_2$ can be obtained. Thereby, the second processing module 24 can determine the angle calibration function θ(Ix).

Finally, the second processing module 24 can calculate the angle between any touch point and the base line L0 according to the determined angle calibration function θ(Ix). When a user touches the panel 12 to generate a touch point, the angle (i.e. θ(In)) between the touch point and the base line L0 can be derived by substituting the Ix coordinate value (such as In) of a reference point corresponding to the touch point into the function $θ(Ix)=a_0+a_1(Ix)+a_2(Ix)^2$ (i.e. $θ(In)=a_0+a_1(In)+a_2(In)^2$). Similarly, the first light sensor 14 can also derives the corresponding angle calibration function θ(Ix) according the foregoing steps.

In practical application, after the calibrating apparatus 2 derives the information about the positions and the angles of the first light sensor 14 and the second light sensor 16 included in the optical touch screen 1, the touch point on the screen can be determined by utilizing triangular functions and triangular positioning (because the predetermined positions of the first light sensor 14 and the second light sensor 16 have been derived, the distance between the first light sensor 14 and the second light sensor 16, the angle between the touch point and the first light sensor 14 and that between the touch point and the second light sensor 16 can be calculated). Additionally, besides the approach of positioning touch point, the goal of gesture inputting can be achieved by capturing the images of users' gestures and then utilizing image processing and gesture recognition technologies.

The second embodiment according to the invention is a calibrating method. The calibrating method can be applied in an image processing apparatus (e.g., an optical touch screen) which includes a panel and at least one light sensor and can be performed to calibrate the position and the angle of the at least one light sensor. In the embodiment, a first indicating point, a second indicating point, and a plurality of reference points, whose coordinates are already known, are displayed on the panel. The at least light sensor is located at a predetermined position near a specific point on the circumference of the panel.

Figure 7:
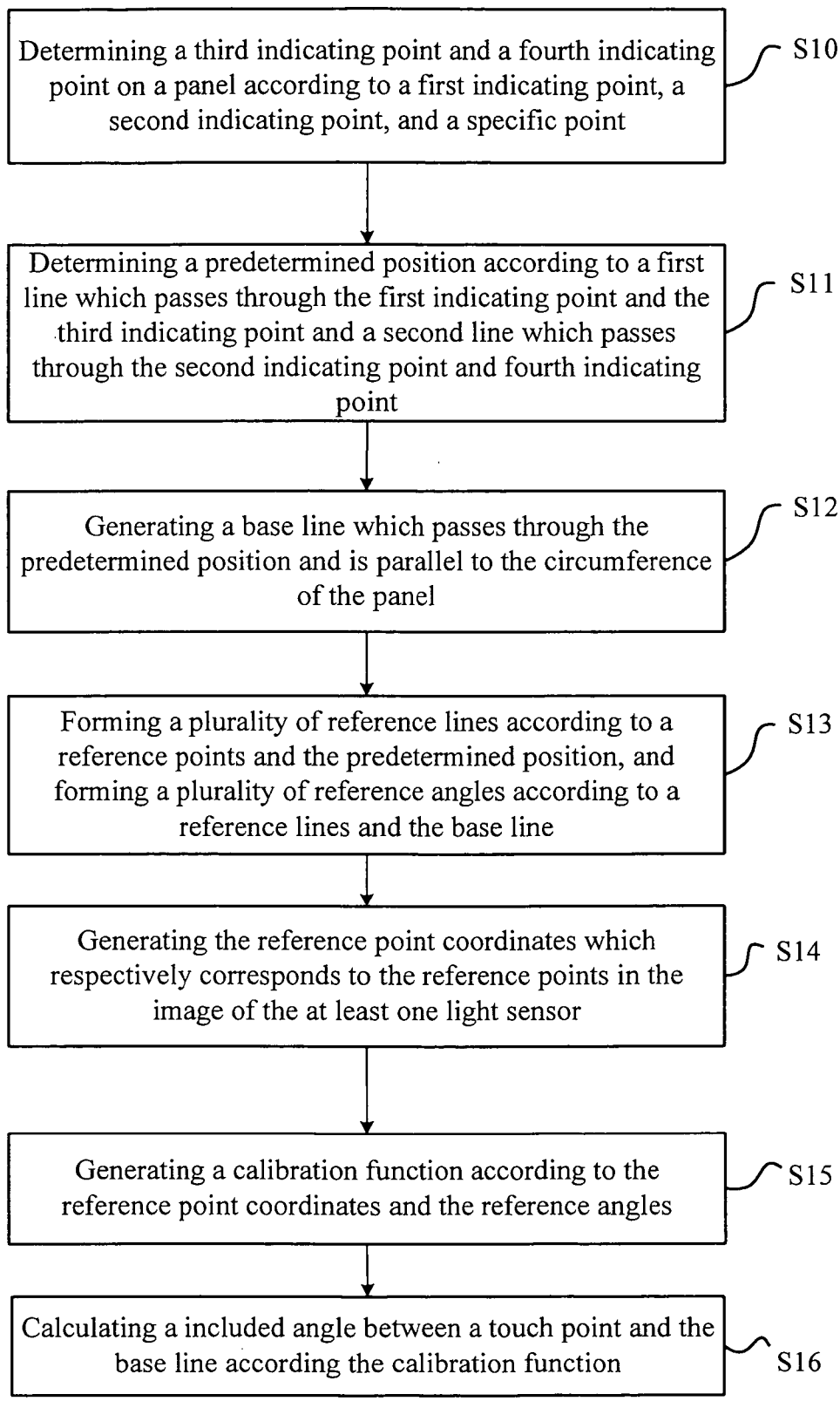
FIG. 7 is a flow chart diagram illustrating the calibrating method according to the second embodiment of the invention.

Please refer FIG. 7. FIG. 7 is a flow chart diagram illustrating the calibrating method according to the second embodiment of the invention. As shown in FIG. 7, the calibrating method can be substantially divided into two stages. In the first stage (step S10~S11), the calibrating method will be performed to determine a predetermined position of the at least one light sensor. In the second stage (step S12~S16), the calibrating method will be performed to further generate a calibration function between the coordinates and the angles for calculating the angle between the at least one light sensor and the touch point.

Figure 8:
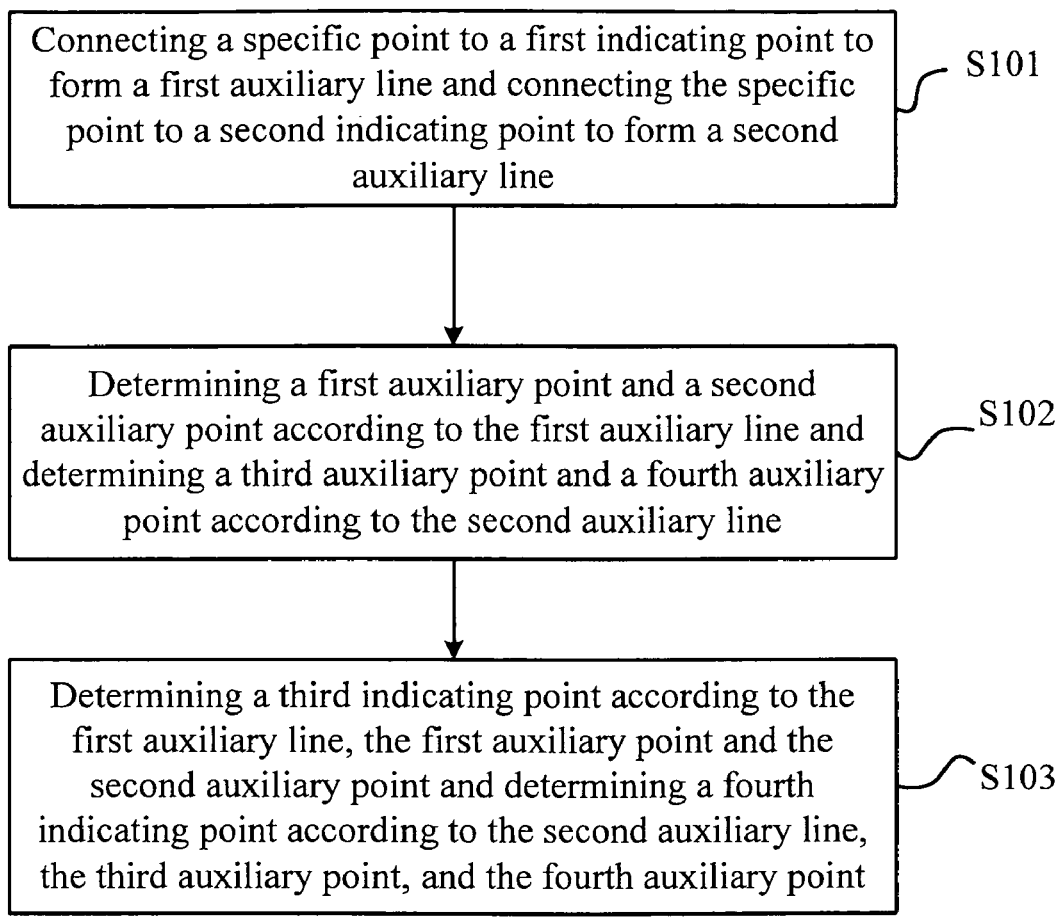
FIG. 8 is a detailed flow chart diagram illustrating step S10 in FIG. 7.

In the first stage, firstly, step S10 of the calibrating method is performed to determine a third indicating point and a fourth indicating point on the panel according to a first indicating point, a second indicating point, and a specific point which is located at the circumference of the panel. In practical application, as shown in FIG. 8, step S10 can be divided into three sub-steps S101~S103. In an embodiment, the specific point can be located at the apex at the upper right corner or the apex at the upper left corner of the panel (as apex T1 or T2 shown in FIG. 3(A)).

In sub-step S101, the calibrating method is performed to connect the specific point to the first indicating point to form a first auxiliary line and connect the specific point to the second indicating point to form a second auxiliary line. In sub-step S102, the calibrating method is performed to determine a first auxiliary point and a second auxiliary point according to the first auxiliary line and determine a third auxiliary point and a fourth auxiliary point according to the second auxiliary line. In sub-step S103, the calibrating method is performed to determine the third indicating point according to the first auxiliary line, the first auxiliary point, and the second auxiliary point and determine the fourth indicating point according to the second auxiliary line, the third auxiliary point, and the fourth auxiliary point.

In practical application, in step S102, the first auxiliary point and the second auxiliary point are located at two sides of the first auxiliary line, and the line which passes through the first auxiliary point and the second auxiliary point is perpendicular to the first auxiliary line; the third auxiliary point and the fourth auxiliary point is located on two sides of the second auxiliary line, and the line which passes through the third auxiliary point and the fourth auxiliary point is perpendicular to the second auxiliary line.

Additionally, in step S103, the third indicating point is calculated according to the first auxiliary point, the second auxiliary point, and a first distance ratio, and the fourth indicating point is calculated according to the third auxiliary point, the fourth auxiliary point, and a second distance ratio. Wherein, the first distance ratio relates to the distance from the first auxiliary point to the first auxiliary line and the distance between the second auxiliary point and the first auxiliary line, and the second distance ratio relates to the distance from the third auxiliary point to the second auxiliary line and the distance from the fourth auxiliary point to the second auxiliary line.

In the embodiment, there is at least one light sensor that will generate a first image according to the first indicating point, the second indicating point, the third indicating point, and the fourth indicating point. In the first image, a first observation point corresponding to the first indicating point and a second observation point corresponding to the second indicating point are different points, a third observation point corresponding to the third indicating point and the first observation point are the same points, and a fourth observation point corresponding to the fourth indicating point and the second observation point are the same points.

Afterwards, step S11 of the calibrating method is performed to determine the predetermined position of the at least one light sensor according to a first line which passes through the first indicating point and third indicating point and a second line which passes through the second indicating point and fourth indicating point. In practical application, the calibrating method can be performed to connect the first indicating point and third indicating point to form a first line and connect the second indicating point and fourth indicating point to form a second line. Since there is an intersecting point between the first line and the second line (i.e. the focal point of the at least light sensor), the calibrating method can be performed to define the intersection point as the predetermined position.

In the second stage, firstly, step S12 of the calibrating is performed to generate a base line which passes through the predetermined position and is parallel to the circumference of the panel.

And, step S13 of the calibrating is performed to form a plurality of reference lines according to the reference points and the predetermined position and form a plurality of reference angles according to the reference lines and the base line. For example, if there are five reference points, the calibrating method can be performed to connect the five reference points to the predetermined position respectively to form five different reference lines. Since five different included angles are between the five reference lines and the base line respectively, the calibrating method can be performed to define these angles as five different reference angles.

Since the coordinates of the reference points and the reference angles are already known, step S14 of the calibrating is performed to generate a plurality of reference point coordinates which respectively corresponds to the reference points in an image of the at least one light sensor. Then, step S15 of the calibrating is performed to generate a calibration function according to the reference point coordinates and the reference angles. In practical application, the calibration function is generated by fitting a curve with a method of curve-fitting, wherein the curve relates to the reference point coordinates and the reference angles.

Finally, step S16 of the calibrating is performed to calculate an included angle between a touch point and the base line according the calibration function.

In practical application, the calibrating method can be performed to further determine the coordinate of a touch point according to the coordinate of the two light sensors and the included angles between the touch point and the two light sensors respectively.

Compared with prior arts, the calibrating apparatus and method according to the invention can effectively calibrate the position and the angle of a light sensor in an image processing apparatus according to a plurality of indicating points, whose coordinates are already known, are displayed on the panel, to avoid the erroneous judgment of touch points because of the deviations of the position and the angle of the light sensor. Thereby, the calibrating apparatus and method according to the invention can greatly increase the precision of the state of the touch point detected by the image processing apparatus or that of gesture recognition.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as being limited only by the metes and bounds of the appended claims.

What is claimed is:

1. A calibrating method for an image processing apparatus, the image processing apparatus comprising a panel and at least one light sensor, a first indicating point, a second indicating point, and a plurality of reference points, whose coordinates are known, being displayed on the panel, the light sensor being located at a predetermined position near a specific point on the circumference of the panel, the calibrating method comprising the steps of:
    (a) determining a third indicating point and a fourth indicating point on the panel according to a first indicating point, a second indicating point, and the specific point;
    (b) determining the predetermined position according to a first line which passes through the first indicating point and third indicating point and a second line which passes through the second indicating point and fourth indicating point;
    (c) generating a base line which passes through the predetermined position and is parallel to the circumference of the panel;
    (d) forming a plurality of reference lines according to the reference points and the predetermined position, and forming a plurality of reference angles according to the reference lines and the base line;
    (e) generating a plurality of reference point coordinates which respectively corresponds to the reference points in an image of the at least one light sensor; and
    (f) generating a calibration function according to the reference point coordinates and the reference angles.

2. The calibrating method of claim 1, wherein the at least one light sensor generates a first image according to the first indicating point, the second indicating point, the third indicating point, and the fourth indicating point, in the first image, a first observation point corresponding to the first indicating point and a second observation point corresponding to the second indicating point are different points, a third observation point corresponding to the third indicating point and the first observation point are the same points, a fourth observation point corresponding to the fourth indicating point and the second observation point are the same points.

3. The calibrating method of claim 1, wherein the at least one light sensor generates a second image according to the reference points, in the second image, a plurality of reference observation points corresponding to the reference points are all different points.

4. The calibrating method of claim 1, wherein step (a) comprises the steps of:
    (a1) connecting the specific point to the first indicating point to form a first auxiliary line and connecting the specific point to the second indicating point to form a second auxiliary line;
    (a2) determining a first auxiliary point and a second auxiliary point according to the first auxiliary line and determining a third auxiliary point and a fourth auxiliary point according to the second auxiliary line; and
    (a3) determining the third indicating point according to the first auxiliary line, the first auxiliary point, and the second auxiliary point and determining the fourth indicating point according to the second auxiliary line, the third auxiliary point, and the fourth auxiliary point.

5. The calibrating method of claim 4, wherein in step (a2), the first auxiliary point and the second auxiliary point are located at two sides of the first auxiliary line, and the line which passes through the first auxiliary point and the second auxiliary point is perpendicular to the first auxiliary line, the third auxiliary point and the fourth auxiliary point are located at two sides of the second auxiliary line, and the line which passes through the third auxiliary point and the fourth auxiliary point is perpendicular to the second auxiliary line.

6. The calibrating method of claim 4, wherein in step (a3), the third indicating point is calculated according to the first auxiliary point, the second auxiliary point, and a first distance ratio, the fourth indicating point is calculated according to the third auxiliary point, the fourth auxiliary point, and a second distance ratio, the first distance ratio relates to the distance from the first auxiliary point to the first auxiliary line and the distance from the second auxiliary point to the first auxiliary line, the second distance ratio relates to the distance from the third auxiliary point to the second auxiliary line and the distance from the fourth auxiliary point to the second auxiliary line.

7. The calibrating method of claim 1, wherein in step (f), the calibration function is generated by fitting a curve with a method of curve-fitting, the curve relates to the reference point coordinates and the reference angles.

8. The calibrating method of claim 1, wherein the specific point is located at the apex at the upper right corner or the apex at the upper left corner of the panel.

9. The calibrating method of claim 1, further comprising the step of:
(g) calculating an included angle between a touch point and the base line according the calibration function.

10. A calibrating apparatus for an image processing apparatus, the image processing apparatus comprising a panel and a light sensor, a first indicating point, a second indicating point, and a plurality of reference points, whose coordinates are known, being displayed on the panel, the light sensor being located at a predetermined position near a specific point on the circumference of the panel, the calibrating apparatus comprising:
a first processing module being coupled to the panel, the first processing module determining a third indicating point and a fourth indicating point on the panel according to the first indicating point, the second indicating point, and the specific point, and determining the predetermined position according to the first line which passes through the first indicating point and third indicating point and a second line which passes through the second indicating point and the fourth indicating point; and
a second processing module being coupled to the first processing module and the panel, the second processing module forming a plurality of reference lines according to the reference points and the predetermined position and forming a plurality of reference angles according to the reference lines and a base line, generating a plurality of reference point coordinates which respectively corresponds to the reference points in an image of the light sensor, and generating a calibration function according to the reference point coordinates and the reference angles, wherein the base line passes through the predetermined position and is parallel to the circumference of the panel.

11. The calibrating apparatus of claim 10, wherein the light sensor generates a first image according to the first indicating point, the second indicating point, the third indicating point, and the fourth indicating point, in the first image, a first observation point corresponding to the first indicating point and a second observation point corresponding to the second indicating point are different points, a third observation point corresponding to the third indicating point and the first observation point are the same points, a fourth observation point corresponding to the fourth indicating point and the second observation point are the same points.

12. The calibrating apparatus of claim 10, wherein the light sensor generates a second image according to the reference points, in the second image, a plurality of reference observation points corresponding to the reference points are all different points.

13. The calibrating apparatus of claim 10, wherein the first processing module comprises:
a first processing unit for connecting the specific point to the first indicating point to form a first auxiliary line and connecting the specific point to the first indicating point to form a second auxiliary line;
a second processing unit, coupled to the first process unit, the second processing unit determines a first auxiliary point and a second auxiliary point which are respectively located at two sides of the first auxiliary line and a third auxiliary point and a fourth auxiliary point which are respectively located on two sides of the second auxiliary line, and determines the third indicating point according to the first auxiliary line, the first auxiliary point, and the second auxiliary point and determines the fourth indicating point according to the second auxiliary line, the third auxiliary point and the fourth auxiliary point; and
a third processing unit, coupled to the first process unit and the second processing unit, the third processing unit connects the first indicating point to the third indicating point to form the first line and connects the second indicating point to the fourth indicating point to form the second line, and the intersection point between the first line and the second line is determined to be the predetermined position.

14. The calibrating apparatus of claim 13, wherein the line which passes through the first auxiliary point and the second auxiliary point is perpendicular to the first auxiliary line, and the line which passes through the third auxiliary point and the fourth auxiliary point is perpendicular to the second auxiliary line.

15. The calibrating apparatus of claim 13, wherein the third processing unit determines the third indicating point according to the first auxiliary point, the second auxiliary point, and a first distance ratio and determines the fourth indicating point according to the third auxiliary point, the fourth auxiliary point, and a second distance ratio, the first distance ratio relates to the distance from the first auxiliary point to the first auxiliary line and the distance from the second auxiliary point to the first auxiliary line, the second distance ratio relates to the distance from the third auxiliary point to the second auxiliary line and the distance from the fourth auxiliary point to the second auxiliary line.

16. The calibrating apparatus of claim 10, wherein the second processing module generates the calibration function by fitting a curve with a method of curve-fitting, the curve relates to the reference point coordinates and the reference angles.

17. The calibrating apparatus of claim 10, wherein the specific point is located at the apex at the upper right corner or the apex at the upper left corner of the panel.

18. The calibrating apparatus of claim 10, wherein the calibration function calculates a first included angle between a touch point and the base line.

19. The calibrating apparatus of claim 18, further comprising a second light sensor, wherein the first processing module determines a predetermined position of the second light sensor, the second processing module generates a calibration function of the second light sensor, and the calibration function calculates a second included angle between the touch point and the base line.

20. The calibrating apparatus of claim 19, wherein the calibrating apparatus generates the coordinate of a touch point according to the first included angle, the second included angle and a distance between the first light sensor and the second light sensor according to the predetermined positions of the first light sensor and the second light sensor.

* * * * *